Aug. 9, 1966      L. F. FRANK      3,264,933
CYLINDRICAL LENS AND LAMINATED PLATE SCANNING SYSTEM
Filed June 18, 1963
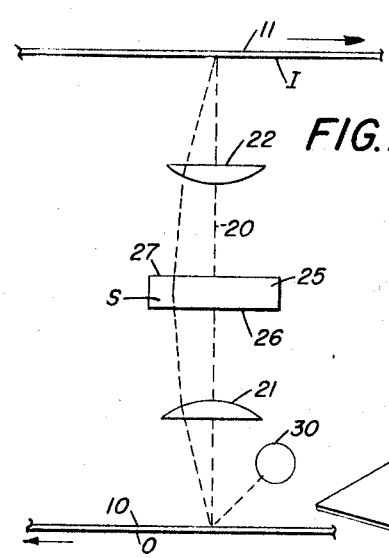
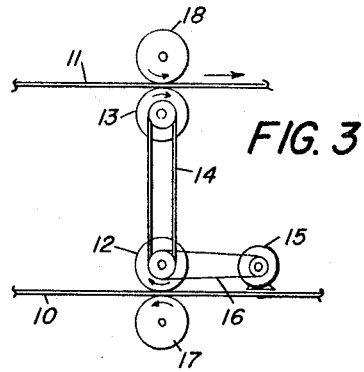
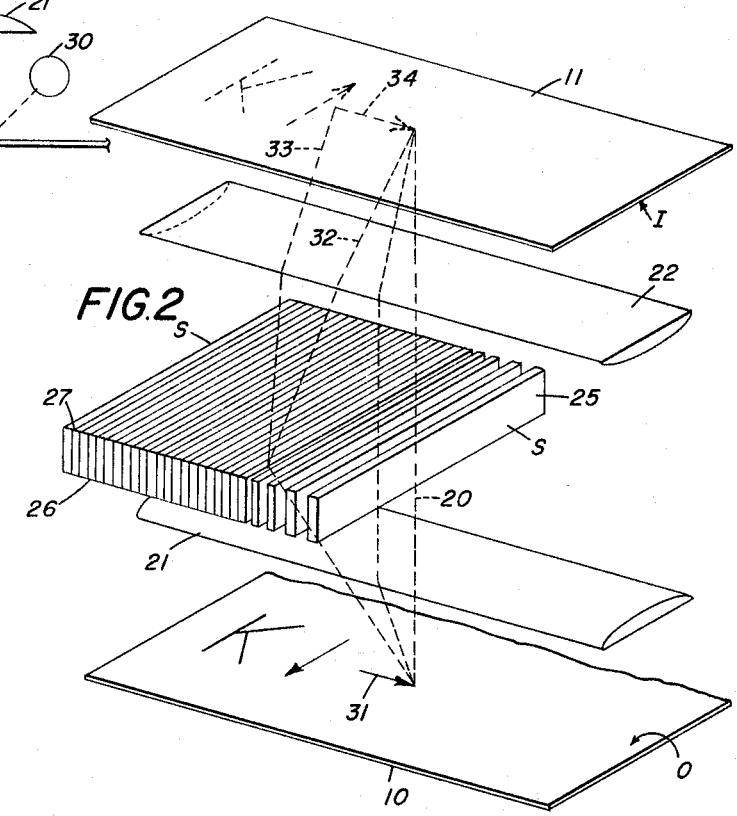
LEE F. FRANK
INVENTOR.
BY R. Frank Smith
Lloyd J. Seebach
ATTORNEY & AGENT ically polished lami-
United States Patent Office 3,264,933
Patented August 9, 1966

3,264,933
CYLINDRICAL LENS AND LAMINATED
PLATE SCANNING SYSTEM
Lee F. Frank, Cambridge, Mass., assignor to Eastman Kodak Company, Rochester, N.Y., a corporation of New Jersey
Filed June 18, 1963, Ser. No. 288,662
8 Claims. (Cl. 88—24)

The present invention relates to an optical scanning system, and more particularly to an optical system including a group of thin, laminated plates cooperating with a symmetrical cylindrical lens system for transmitting line-by-line images of an original to a light-sensitive copy material on which a right reading, light image of the original is formed.

In a conventional contact printing system, an original is placed in contact with a photosensitive material and subjected to intense illumination for exposing an image of the original on the photosensitive surface by transmission of the light through the original so that a right reading image is obtained only when the image on one surface of the original is transmitted through the original to the photosensitive material. Whether the information on the original is in contact with the photosensitive surface of the copy material, or is transmitted through the original, the original cannot be impervious to light, but must be capable of transmitting some light so as to permit making of a copy. In such systems the amount of light that is transmitted through the original and actually used for exposing the photosensitive material is only about 50% of the light actually incident on the surface of the original. This loss of illumination is due to reflection of the light by the surface of the original and the diffraction of the light transmitted through the original. Accordingly, in any type of reproduction system an intense light source is required in order to provide sufficient light for the necessary exposure.

In systems utilizing a flow type of reproduction wherein the original is moved in one direction and the photosensitive copy material is moved in another direction through a plane which is spaced a considerable distance from the plane of the original, the light source is usually positioned in close proximity to the surface of the original so that in this case the amount of light incident on the photosensitive material is also approximately 50%. The flow type system has a disadvantage, however, in that the copy of the original is of reduced size so that an exact copy can be made only by making an enlargement of the flow copy.

While the systems mentioned hereinabove have advantages as well as disadvantages, depending on the type of copy and the purpose for which such copy is to be used, the flow systems have the common disadvantage that complex mechanisms and optical systems are required to provide a feasible apparatus. In the invention described hereinafter, a relatively simple optical system suitable for use in countercurrent scanners comprises a symmetrical system of cylindrical lenses and an opt
nated slab of plano-parallel glass plates. Although diffraction limits the image resolution for production of printed matter, the light incident on the photosensitive material is sufficient because some of the light that is diffused at the object plane is combined with the focused light in the image area. Further, the system has high light efficiency and can be used with high power light sources to produce a bright image.

The primary object of the invention is to provide an optical scanner system by which a right reading, light image copy of an original can be obtained by the use of a simple, symmetrical cylindrical lens system and a laminated slab of plano-parallel plates.

Another object of the invention is to provide an optical scanner system in which the original and copy material are moved in opposite directions with respect to the optical system comprising symmetrically arranged cylindrical lenses of equal power with a laminated slab of plano-parallel plates arranged between said lenses so as to obtain a right reading, light image copy of unit magnification.

Still another object of the invention is to provide an optical scanner system which is relatively simple and inexpensive to manufacture as well as feasible for copying originals which can be transparent or opaque and of any length.

These and other objects and advantages will be apparent to those skilled in the art by the description which follows.

Reference is now made to the accompanying drawing wherein like reference numerals and letters designate like parts and wherein:

FIG. 1 is a schematic view showing the relation of the object and image planes and the optical system arranged therebetween;

FIG. 2 is a perspective view of the elements shown in FIG. 1 and showing the various light paths that a point source in the object plane takes in its transmission through the optical system to the image plane; and FIG. 3 is a diagrammatic view of a drive mechanism for moving the original and copy material in opposite directions.

With reference to FIGS. 1 and 2, an original 10 is moved in a horizontal plane which may be referred to as an object plane O. Spaced from plane O and parallel thereto a copy material 11 is moved through an image plane I and in a direction opposite to that of the original 10. As shown in FIG. 3, the original 10 and copy material 11 are moved in opposite directions by means of a pair of rollers 12 and 13 which are interconnected by a belt or a chain 14. A drive means for rollers 12 and 13 is derived from a motor 15 which, in turn, is connected by a belt or chain 16 to roller 12. Suitable rollers 17 and 18, respectively, engage rollers 12 and 13 to provide a means for frictionally driving the original and copy material in synchronism through the object and image planes, respectively. The rollers 12, 13, 17 and 18 are preferably rubber rollers so as to provide a more positive engagement with the original and copy material. Such rollers extend transversely of the paths of movement of the original and copy material and can be single rollers or a plurality of spaced rollers located in any position along said paths of movement but preferably close to the optical system to be described hereinafter. A dotted line 20, as shown in FIGS. 1 and 2, is perpendicular to the object plane O and the image plane I and defines an optical plane perpendicular to and between said planes O and I. A first cylindrical lens 21 is optically aligned with a second cylindrical lens 22 between the object and image planes with their cylindrical axes parallel to each other, to said image and object planes and lying in the plane defined by line 20, as seen in FIG. 1. The cylindrical lenses 21 and 22 are each arranged with their plano surfaces facing their respective object and image planes so that their focal lines lie in their adjacent plane. As a result, a line extending transversely of the original 10 will be imaged as an astigmatic image in the image plane I. A laminated slab of plano-parallel plates 25 is arranged centrally between the cylindrical lenses 21 and 22, and since said lenses are of equal focal length, the plates will also be positioned centrally with respect to the object and image planes.

The group of laminated plates 25 are arranged so that their sides S are perpendicular to the image and object planes and to the cylindrical axes of the lenses 21 and 22.

The entrance edges 26 and the exit edges 27 of plates 25 lie in planes which are also parallel to the object and image planes. As will be described in full hereinafter, the plurality of plates directly differentiate in one azimuth the light received by each of the entrance edges 26 from each corresponding linear portion of the original and transmit about half of this light directly through each of the plates to the image plane.

The optical property of the plate laminated slab 25 that distinguishes it from a normal plano-parallel glass plate is illustrated in FIG. 2. As shown in FIG. 1, a light source 30 is arranged adjacent the object plane O for illuminating the original as it is moved past the optical line or plane 20. By way of explanation, a point of light incident on the right-hand tip of the arrow 31 on the original 10 and in the object plane O, as shown in FIG. 2, is reflected in all directions. The portion of the light which is reflected perpendicular to the object plane passes directly through the plate 25 which is directly aligned therewith and is imaged, as shown in FIG. 2, in the image plane without any loss of illumination. Assume that another ray of light is reflected at an angle from the same point and in the optical line or plane 20 so as to be incident on the entrance edge 26 of another plate 25. Due to the angle at which it is incident on the edge 26, provided such angle is not a grazing angle, this ray is reflected back and forth within the plate and emerges from the exit edge 27 at one of two angles depending on which surface of the plate it is last reflected from. If the last surface is a left-hand surface, then the light will be directed in a path 32 corresponding to that of its entry and will be finally imaged in coincidence with the original point in the line or plane 20. If the light is last reflected from the other surface, it will then emerge from the exit edge 27 in an equally opposite divergent angle to form a light image spaced from the original point and to the left thereof as indicated by the intersection of the line 33 and the dotted line 34, the latter being the image of the arrow 31 in the image plane 11. The light incident at such point in the image plane I is not sufficient to expose a corresponding point on the copy material.

The laminated slab of plates 25 uses approximately half the light incident on the entrance edges 26 to form an image by pencils of light in the plane 20 which is perpendicular to the faces of the slab as defined by the edges 26 and 27 and the sides S of the individual plates. The object and image are equal in size and distance from the slab. When the laminated slab is used in series with two cylindrical lenses to form a symmetrical optical system, as shown in FIG. 2, there exists an image and object distance at which a real image is formed which, in this case, lies in the image plane I. This image is correctly oriented for countercurrent scanning and the system can be extended to any width in accordance with the size of the original to be reproduced. The definition of the image is limited by the diffraction from the edges of the plates and by the width of the plates so that there is a minimum thickness of plate which produces a maximum resolution for each object to focal plane distance. A resolution of the order of 100 lines/in. can be accomplished with such an optical system.

As the original 10 and light-sensitive copy material 11 are moved toward the line or plane 20 from opposite directions, a line extending across the original forms the object in the object plane O of the cylindrical lens 21 and after transmission through the laminated slab of plates 25, an astigmatic image is formed by lens 22 in the image plane I. A portion of the transverse line in the object plane is transmitted by each of the elements 25 so that a line-by-line reproduction of the original is formed as the original and the copy material are moved in opposite directions.

It will be apparent to those skilled in the art that the lenses 21 and 22 can be readily formed from a clear plastic material as well as glass and that the laminated slab of plano-parallel plates 25 can also be formed of glass or of a plastic material and, to provide the most efficient results, each of the elements 25 should be optically insulated from each other. It will also be obvious to those skilled in the art that other optical systems may be utilized for providing an astigmatic image so as to be used with the laminated slab to provide a similar optical system. However, the invention is not to be limited to the embodiment disclosed and described herein, but is of a scope as defined by the appended claims.

The embodiments of the invention in which an exclusive property or privilege is claimed are defined as follows:

1. An optical system for producing on an image plane a right reading image of an original in an object plane optically parallel to and spaced from said image plane, comprising:
   two cylindrical lenses optically aligned between said image and object planes with their cylindrical axes in one azimuth parallel to each other and to said image and object planes, each of said lenses having its plano surface facing the respective image or object plane and with said plano surface spaced therefrom by a distance substantially equal to the focal length of the lens, whereby said lenses form an astigmatic image of a portion of said object plane on said image plane; and
   a plurality of thin, flat plate elements stacked centrally between and spaced from each of said cylindrical lenses, each of said elements having parallel surfaces that are perpendicular to said image and object planes and to said one azimuth, and plano entrance and exit surfaces that lie in planes parallel to said image and object planes, whereby said elements directionally differentiate in said one azimuth the light received by each of said entrance surfaces from each point in said object plane and for transmitting about half of said light directly through each of said elements to said image plane.

2. An optical system in accordance with claim 1 wherein said cylindrical lenses are equally and symmetrically arranged with respect to said image and object planes.

3. An optical system in accordance with claim 1 wherein the focal line of one of said cylindrical lenses is coincident with said object plane and the focal line of the other of said cylindrical lenses is coincident with said image plane.

4. An optical system in accordance with claim 1 wherein said plate elements are optically insulated from each other.

5. An optical system in accordance with claim 1 wherein said plate elements comprise a plano-surface laminated slab in which each of said plates is optically insulated from those adjacent thereto.

6. A countercurrent scanning system for producing a right reading light image copy of an original, the combination comprising:
   means defining an object plane and an image plane spaced from and parallel to said object plane;
   means for synchronously moving said original in a path through said object plane in one direction and a light-sensitive copy material in a path through said image plane in the opposite direction;
   means arranged adjacent said object plane for directly illuminating said original;
   two cylindrical lenses optically aligned between said image and object planes with their cylindrical axes in one azimuth parallel to each other and to said image and object planes, each of said lenses having its plano surface facing the respective image or object plane and with said plano surface spaced therefrom by a distance substantially equal to the focal length of the lens, whereby said lenses form an astigmatic line-by-line image of said original on said copy material; and a plurality of thin, flat plate elements stacked centrally between and spaced from said cylindrical lenses and transversely of the paths of movement of said original and said copy material, each of said elements having parallel surfaces that are perpendicular to said image and object planes and to said one azimuth, and plano entrance and exit surfaces that lie in planes parallel to said image and object planes, whereby said elements directionally differentiate in said one azimuth the light received by each of said entrance surfaces from each point in a transverse line of said original and for transmitting about half of said light directly through each of said elements to said copy material.

7. A countercurrent scanning system in accordance with claim 6 wherein said plate elements are optically insulated from each other.

8. A countercurrent scanning system in accordance with claim 6 wherein said plate elements comprise a plano-surfaced, laminated slab in which each of said plate elements is optically insulated from those adjacent thereto.

References Cited by the Examiner

UNITED STATES PATENTS 3,060,805   10/1962   Brumley _____ 88—1 X

NORTON ANSHER, *Primary Examiner*.

EVON C. BLUNK, *Examiner*.

R. A. WINTERCORN, *Assistant Examiner*.